United States Patent [19]

Imaizumi

[11] Patent Number: 5,321,457
[45] Date of Patent: Jun. 14, 1994

[54] REAL IMAGE TYPE FINDER SYSTEM THAT CHANGES AN ASPECT RATIO OF A VISUAL FIELD BY VARYING MAGNIFICATION

[75] Inventor: Masaki Imaizumi, Tokyo, Japan

[73] Assignee: Olympus Optical Co., Ltd., Tokyo, Japan

[21] Appl. No.: 115,797

[22] Filed: Sep. 3, 1993

Related U.S. Application Data

[63] Continuation of Ser. No. 783,156, Oct. 28, 1991, abandoned.

[30] Foreign Application Priority Data

Oct. 29, 1990 [JP] Japan ................... 2-288445

[51] Int. Cl.⁵ .............. G02B 15/00; G03B 13/10; G03B 37/00
[52] U.S. Cl. .................. 354/222; 354/159; 359/434; 359/676
[58] Field of Search ............. 354/219, 222, 94, 159; 359/434, 676

[56] References Cited

U.S. PATENT DOCUMENTS

| | | | |
|---|---|---|---|
| 4,270,837 | 6/1981 | Baker | 359/434 X |
| 4,652,104 | 3/1987 | Harvey | 354/222 X |
| 4,715,692 | 12/1987 | Yamada et al. | 354/222 X |
| 4,990,946 | 2/1991 | Gates | 354/222 |
| 5,021,815 | 6/1994 | Harvey | 354/222 |
| 5,117,247 | 5/1992 | Nakai et al. | 354/222 |

FOREIGN PATENT DOCUMENTS 58-38116 3/1983 Japan.

*Primary Examiner*—Michael L. Gellner
*Assistant Examiner*—J. K. Han
*Attorney, Agent, or Firm*—Cushman, Darby & Cushman

[57] ABSTRACT

A real image type finder system comprising an objective lens system, a relay lens system and a field stop arranged at the location at which an image is to be formed by said objective lens system: and adapted to be changed into a panorama finder system by replacing the relay lens system with another relay lens system having a magnification different from that of said relay lens system and exchanging the field stop with another field stop having an aperture of a shape having an aspect ratio different from that of the aperture shape of said field stop.

5 Claims, 3 Drawing Sheets

REAL IMAGE TYPE FINDER SYSTEM THAT CHANGES AN ASPECT RATIO OF A VISUAL FIELD BY VARYING MAGNIFICATION

This is a continuation of application Ser. No. 07/783,156, filed on Oct. 28, 1991, which was abandoned upon the filing hereof.

BACKGROUND OF THE INVENTION a) Field of the Invention

The present invention relates to a finder system which is to used for cameras permitting changing film sizes b) Description of the Prior Art In the recent years, panorama size film which is free from the conventional film formats has been placed on the market and used with good results. In this trend, manufacturers of photographing appliances are preparing film masks, finder masks and so on which are to be used with the panorama size film.

However, the finder masks which have so far been disclosed for use with the panorama size film are designed so as to obtain an oblong section within a visual field by forming a rectangular mark therein cannot provide an impression of oblong elongation of the visual field.

SUMMARY OF THE INVENTION

A primary object of the present invention is to provide a finder system which is capable of enhancing magnification and changing aspect ratio so as to permit observation within a horizontally elongated visual field when a film format is changed to the panorama size.

The finder system according to the present invention is of a real image type which comprises an objective lens system, a relay lens system and an eyepiece lens system, and is adapted to exchange field stop disposed on an image surface with another having a different aspect ratio when magnification of the relay lens system is changed.

In the finder system according to the present invention, magnification of the relay lens system can be changed by exchanging the relay lens system with another, displacing the relay lens system as a whole, moving one or some of the lens units composing the relay lens system along the optical axis, or by other methods.

Further, the field stop is arranged at the location of an image formed by the objective lens system and is to be exchanged with another having a different aspect ratio. The field stop may be disposed at the location of an image formed by the relay lens system and exchanged with the other, or alternately one field stop may be disposed at the location of an image formed by the objective lens system and the other field stop may be disposed at the location of an image formed by the relay lens system.

DETAILED DESCRIPTION OF THE PREFERRED EMBODIMENTS

Now, the finder system according to the present invention will be described in more detail with reference to the preferred embodiments illustrated in the accompanying drawings.

Figure 1A:
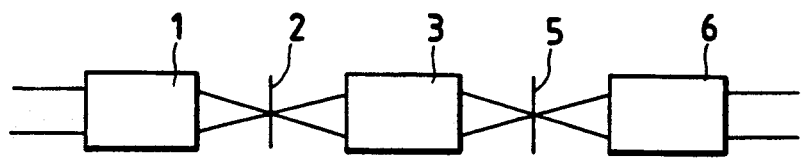
FIG. 1A and FIG. 1B show sectional views illustrating composition of Embodiment 1 of the finder system according to the present invention.

The Embodiment 1 of the finder system according to the present invention has the composition illustrated in FIG. 1A, wherein the reference numeral 1 represents an objective lens system, the reference numeral 2 designates a first surface on which an image is to be formed by the objective lens system, the reference numeral 3 denotes a relay lens system for refocusing the image formed on the first image surface, and the reference numeral 5 represents a second image surface on which the image formed on the first image surface is to be refocused by the relay lens system. The reference numeral 6 designates an eyepiece lens system which is to be used for observing an image formed on the second image surface. The finder system preferred as the Embodiment 1 of the present invention is composed of the objective lens system, the relay lens system and the eyepiece lens system described above.

Figure 1B:
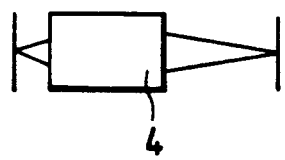

In this finder system, magnification for the image to be observed through the eyepiece lens system 6 is enhanced by exchanging the relay lens system 3 with another relay lens system 4 shown in FIG. 1B. Simultaneously with the enhancement of the magnification of the finder system for observing the image as described above, a field stop disposed on the first image surface is exchanged with another field stop which is different from the ordinary field stop or has the aspect ratio of the panorama size. Owing to the enhancement of the magnification and the exchange of the field stop, the finder system is changed into a panorama finder system which is capable of producing an impression of horizontally elongated visual field.

Figure 2A:
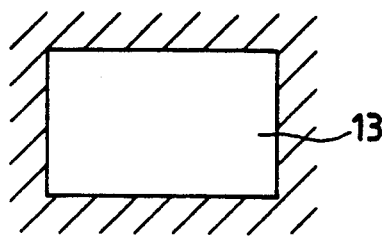
FIG. 2A and FIG. 2B show front views of the field stops to be used in the Embodiment 1 of the present invention.
Figure 2B:
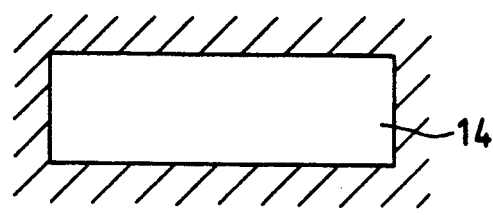

FIG. 2A and FIG. 2B show front views illustrating shapes of the field stops to be arranged on the first image surface of the finder system shown in FIG. 1 and FIG. 2. Out of these field stops, the field stop 13 shown in FIG. 2A is to be used in combination with the relay lens system 3, whereas the field stop 14 shown in FIG. 2B is to be used when the relay lens system 4 is disposed in the finder system. When it is assumed that the relay lens system 14 can enhance magnification of the finder system $\beta$ times as high as that of the finder system adopting the relay lens system 3 and that the field stop 13 shown in FIG. 2A has an aspect ratio of 2:3, a field stop having an aspect ratio of $2/\beta:6/\beta$ is to be used as the field stop 14 illustrated in FIG. 2B.

When the relay lens system 3 is replaced with the relay lens system 4 shown in FIG. 1B and the field stop arranged on the first image surface 2 is exchanged from the field stop 13 illustrated in FIG. 2A to the field stop 14 shown in FIG. 2B in the finder system illustrated in FIG. 1A, the image to be observed through the finder system is magnified $\beta$ times as large and formed in the visual field having the panorama size.

Figure 3A:
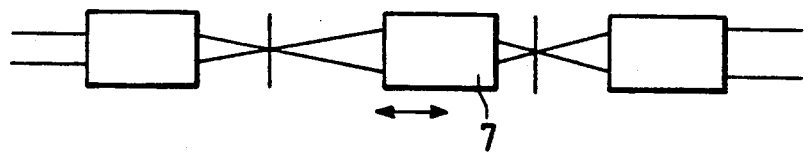
FIG. 3A and FIG. 3B show sectional views illustrating composition of Embodiment 2 of the finder system according to the present invention.
Figure 3B:
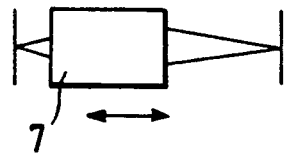

FIG. 3A shows a finder system, similar to that described above, which is adapted to change magnification for the image formed by a relay lens system 7 from $1:1/\sqrt{\beta}$ to $1:\sqrt{\beta}$ by displacing the relay lens system 7 to the location shown in FIG. 3B. The magnification of the finder system is enhanced $\beta$ times as high by displacing the relay lens system 7 without changing the locations of the first image surface and the second image surface.

Figure 4A:
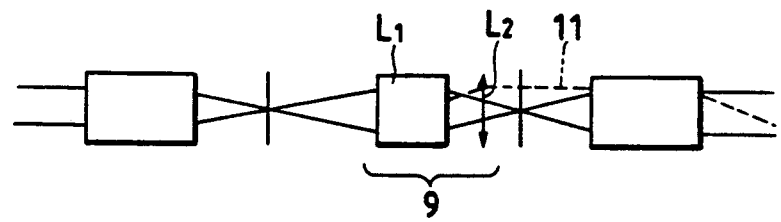
FIG. 4A and FIG. 4B show sectional views illustrating composition of Embodiment 3 of the finder system according to the present invention.
Figure 4B:
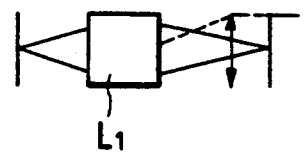

The finder system illustrated in FIG. 4A comprises a relay lens system composed of a lens unit or lens component $L_1$ and another lens unit or lens component $L_2$, out of which the lens unit or lens component $L_1$ is to be moved along the optical axis to the location shown in FIG. 4B. That is to say, magnification of this finder system is changed by moving the lens unit or lens component $L_1$ along the optical axis while keeping stationary the lens unit or lens component $L_2$ (or a field lens having a main function to transmit a pupil) which is arranged at the location closest to the second image surface out of the lens units or lens components composing the relay lens system. In this case, it is preferable to keep stationary the lens unit or lens component $L_2$, which is positive, as illustrated in FIG. 4A and FIG. 4B so that an offaxial ray 11 is led reasonably into the eyepiece lens system.

This finder system can have an enhanced magnification and permits observation within the panorama visual field, like the other embodiments already described above, when the lens unit or lens component $L_1$ is displaced and field stops are exchanged from one to the other on the first image surface.

Though the field stops are arranged on the first image surface in the Embodiments 1 through 3 above, it is possible to arrange the field stops on the second image surface. The field stops to be arranged on the second image surface have the shapes shown in FIG. 5A and FIG. 5B. The field stop shown in FIG. 5A has an aspect ratio of approximately 2:3 which is to be used for the ordinary film size. For photographing at the panorama film size, the field stop having an aspect ratio of approximately 2:6 as shown in FIG. 5B is used.

Figure 5A:
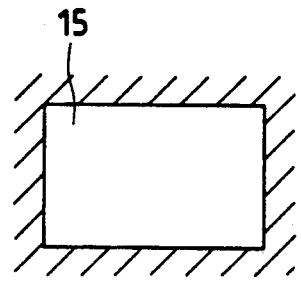
FIG. 5A, FIG. 5B, FIG. 6A and FIG. 6B show front views illustrating another example of the field stops to be used in the finder system according to the present invention.
Figure 5B:
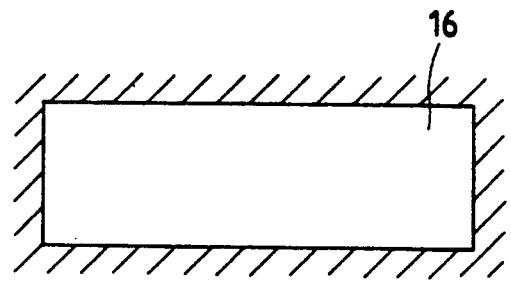

The visual field of the finder system can be changed from the ordinary size to the panorama size by changing the magnification of the finder system and exchanging the field stop shown in FIG. 5A with that illustrated in FIG. 5B on the second image surface.

Figure 6A:
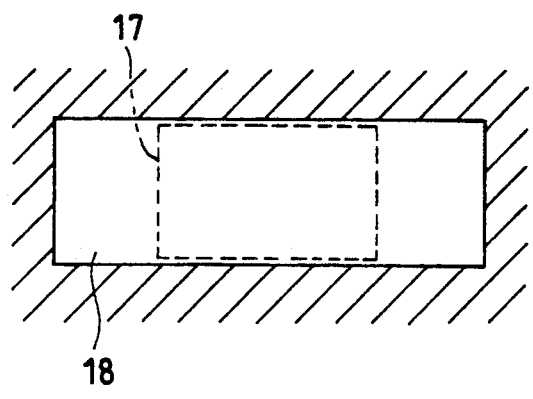
Figure 6B:
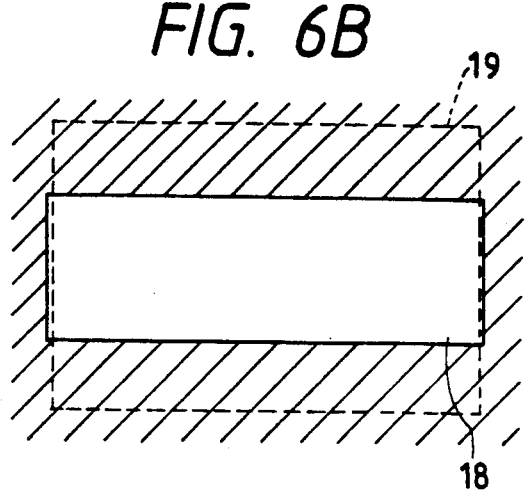

Further, it is possible, for example, to arrange a field stop having an aspect ratio of approximately 2:3 on the first image surface and another field stop having an aspect ratio of approximately 2:6 on the second image surface. In this case, an image of the field stop 17 disposed on the first image surface is formed at a magnification of 1:1 within the range of the field stop disposed on the second image surface as shown in FIG. 6A. When the image of the field stop 17 disposed on the first image surface is magnified by replacing or displacing the relay lens system, the image of the field stop 17 is enlarged on the second image surface as shown in dashed lines in FIG. 6B and the field stop 18 allows observation within the visual field of the panorama size through the eyepiece lens system.

Now, some examples of the optical system for the finder system according to the present invention will be described below with reference to the numerical data adopted therefor:

EXAMPLE 1

$r_1 = -72.0016$
  $d_1 = 1.000$   $n_1 = 1.58362$   $\nu_1 = 30.37$
$r_2 = 16.4843$ (aspherical surface)
  $d_2 = 20.788$
$r_3 = 6.0215$ (aspherical surface)
  $d_3 = 3.300$   $n_2 = 1.49260$   $\nu_2 = 58.02$
$r_4 = 325.4231$
  $d_4 = 0.300$
$r_5 = 16.5366$
  $d_5 = 1.505$   $n_3 = 1.58362$   $\nu_3 = 30.37$
$r_6 = 5.6908$
  $d_6 = 1.700$
$r_7 = 9.3402$ (aspherical surface)
  $d_7 = 1.907$   $n_4 = 1.49260$   $\nu_4 = 58.02$
$r_8 = 69.3520$
  $d_8 = 0.500$
$r_9 = 21.0760$
  $d_9 = 14.500$   $n_5 = 1.49260$   $\nu_5 = 58.02$
$r_{10} = -12.7613$
  $d_{10} = 1.5$
$r_{11} = \infty$
  $d_{11} = D_1$ (variable)
$r_{12} = 9.9812$ (aspherical surface)
  $d_{12} = 3.147$   $n_6 = 1.49260$   $\nu_6 = 58.02$
$r_{13} = 59.4411$
  $d_{13} = 0.550$
$r_{14} = 4.5000$
  $d_{14} = 4.050$   $n_7 = 1.49260$   $\nu_7 = 58.02$
$r_{15} = -15.9185$
  $d_{15} = 0.910$
$r_{16} = -5.7959$
  $d_{16} = 1.7315$   $n_8 = 1.80518$   $\nu_8 = 25.43$
$r_{17} = 2.6705$
  $d_{17} = 1.008$
$r_{18} = 8.6701$
  $d_{18} = 5.026$   $n_9 = 1.49260$   $\nu_9 = 58.02$
$r_{19} = -4.4586$
  $d_{19} = 13.879$
$r_{20} = 9.7314$
  $d_{20} = 3.283$   $n_{10} = 1.49260$   $\nu_{10} = 58.02$
$r_{21} = 99.8328$
  $d_{21} = D_2$ (variable)
$r_{22} = \infty$
  $d_{22} = 17.130$
$r_{23} = 70.2848$
  $d_{23} = 2.900$   $n_{11} = 1.49260$   $\nu_{11} = 58.02$
$r_{24} = -10.6502$

|  | $D_1$ | $D_2$ |
|---|---|---|
| for ordinary size | 32.886 | 3.602 |
| for panorama size | 3.000 | 33.488 | aspherical surface coefficient ($r_2$)
$P = 1.0$,   $A_4 = -0.17175 \times 10^{-3}$
$A_6 = -0.18264 \times 10^{-5}$,   $A_8 = 0.63268 \times 10^{-7}$ aspherical surface coefficient ($r_3$)
$P = 1.0$,   $A_4 = -0.50189 \times 10^{-3}$
$A_6 = -0.58085 \times 10^{-6}$,   $A_8 = -0.38715 \times 10^{-6}$ aspherical surface coefficient ($r_7$)
$P = 1.0$,   $A_4 = -0.25756 \times 10^{-3}$
$A_6 = -0.45680 \times 10^{-5}$,   $A_8 = 0.24932 \times 10^{-6}$ aspherical surface coefficient ($r_{12}$)
$P = 1.0$,   $A_4 = -0.11658 \times 10^{-3}$
$A_6 = -0.65054 \times 10^{-5}$,   $A_8 = -0.12812 \times 10^{-7}$

EXAMPLE 2

$r_1 = -72.0016$
  $d_1 = 1.000$   $n_1 = 1.58362$   $\nu_1 = 30.37$
$r_2 = 16.4843$ (aspherical surface)
  $d_2 = 20.788$
$r_3 = 6.0215$ (aspherical surface)
  $d_3 = 3.300$   $n_2 = 1.49260$   $\nu_2 = 58.02$ -continued $r_4 = 325.4231$
  $d_4 = 0.300$
$r_5 = 16.5366$
  $d_5 = 1.505$   $n_3 = 1.58362$   $\nu_3 = 30.37$
$r_6 = 5.6908$
  $d_6 = 1.700$
$r_7 = 9.3402$ (aspherical surface)
  $d_7 = 1.9067$   $n_4 = 1.49260$   $\nu_4 = 58.02$
$r_8 = 69.3520$
  $d_8 = 0.500$
$r_9 = 21.0760$
  $d_9 = 14.500$   $n_5 = 1.49260$   $\nu_5 = 58.02$
$r_{10} = -12.7613$
  $d_{10} = 1.5$
$r_{11} = \infty$
  $d_{11} = D_1$ (variable)
$r_{12} = 11.3824$ (aspherical surface)
  $d_{12} = 2.400$   $n_6 = 1.49260$   $\nu_6 = 58.02$
$r_{13} = -60.8967$
  $d_{13} = 0.100$
$r_{14} = 4.5000$
  $d_{14} = 4.004$   $n_7 = 1.49260$   $\nu_7 = 58.02$
$r_{15} = -29.5247$
  $d_{15} = 0.890$
$r_{16} = -7.1984$
  $d_{16} = 1.500$   $n_8 = 1.80518$   $\nu_8 = 25.43$
$r_{17} = 3.4005$
  $d_{17} = 0.999$
$r_{18} = 8.9330$
  $d_{18} = 4.993$   $n_9 = 1.49260$   $\nu_9 = 58.02$
$r_{19} = -4.5155$
  $d_{19} = D_2$ (variable)
$r_{20} = 7.8528$
  $d_{20} = 3.7759$   $n_{10} = 1.49260$   $\nu_{10} = 58.02$
$r_{21} = 9.7966$
  $d_{21} = 4.589$
$r_{22} = \infty$
  $d_{22} = 17.107$
$r_{23} = 70.2848$
  $d_{23} = 2.900$   $n_{11} = 1.49260$   $\nu_{11} = 58.02$
$r_{24} = -10.6502$

|  | $D_1$ | $D_2$ |
|---|---|---|
| for ordinary size | 28.164 | 0.500 |
| for panorama size | 17.666 | 10.997 | aspherical surface coefficient ($r_2$)
$P = 1.0$,    $A_4 = -0.17175 \times 10^{-3}$
$A_6 = -0.18264 \times 10^{-5}$,   $A_8 = 0.63268 \times 10^{-7}$ aspherical surface coefficient ($r_3$)
$P = 1.0$,    $A_4 = -0.50189 \times 10^{-3}$
$A_6 = -0.58085 \times 10^{-6}$,   $A_8 = -0.38715 \times 10^{-6}$ aspherical surface coefficient ($r_7$)
$P = 1.0$,    $A_4 = -0.25756 \times 10^{-3}$
$A_6 = -0.45680 \times 10^{-5}$,   $A_8 = 0.24932 \times 10^{-6}$ aspherical surface coefficient ($r_{12}$)
$P = 1.0$,    $A_4 = -0.28524 \times 10^{-3}$
$A_6 = 0.76707 \times 10^{-5}$,   $A_8 = 0.53327 \times 10^{-8}$ wherein the reference symbols $r_1$, $r_2$, ... represent the radii of curvature on the surfaces of the respective lens components, the reference symbols $d_1$, $d_2$, ... designate the thicknesses of the respective lens components and the airspaces reserved therebetween, the reference symbols $n_1$, $n_2$, ... denote the refractive indices of the respective lens components, and the reference symbols $\nu_1$, $\nu_2$, ... represent the Abbe's numbers of the respective lens components.

Figure 7:
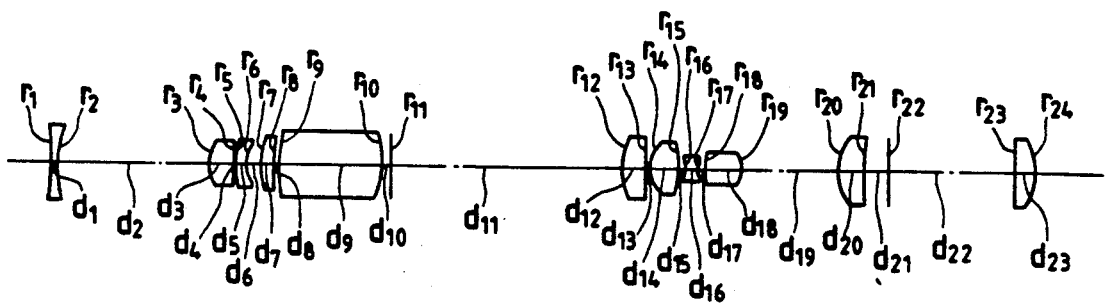
FIG. 7 and FIG. 8 show sectional views illustrating Example 1 of the optical system for the finder system according to the present invention.
Figure 8:
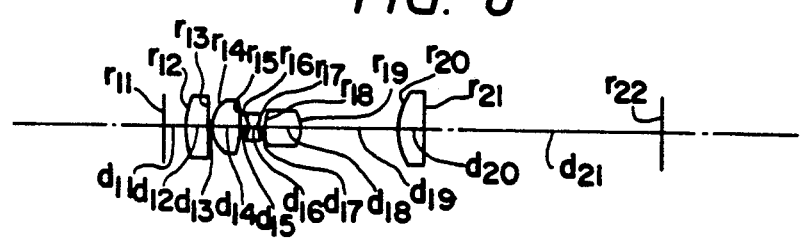

The Example 1 is an optical system for the finder system which has the composition illustrated in FIG. 7 and FIG. 8. FIG. 8 shows a sectional view illustrating composition of a section which is arranged between the first image surface to the second image surface of the finder optical system, and is to be displaced for obtaining the visual field of the panorama size.

In FIG. 8, the reference symbols $r_1$ through $r_{10}$ represent an objective lens system, the reference symbol $r_{11}$ designates the first image surface, the reference symbols $r_{12}$ through $r_{21}$ denote a relay lens system, the reference symbol $r_{22}$ represents the second image surface, and the reference symbols $r_{23}$ and $r_{24}$ designate an eyepiece lens system.

The Example 1 is to be used in the Embodiment 2 described above and adapted to change the magnification thereof by displacing the relay lens system along the optical axis. Speaking more concretely, the magnification of the finder optical system illustrated in FIG. 7 is changed by displacing the relay lens system $r_{12}$ through $r_{21}$ to the location shown in FIG. 8.

Figure 9:
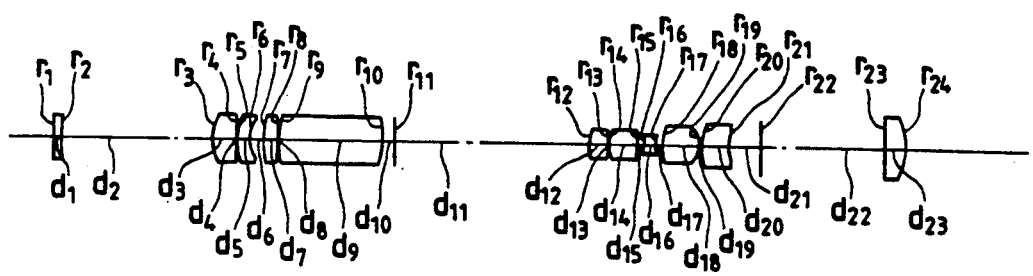
FIG. 9 and FIG. 10 show sectional views illustrating Example 2 of the optical system for the finder system according to the present invention.
Figure 10:
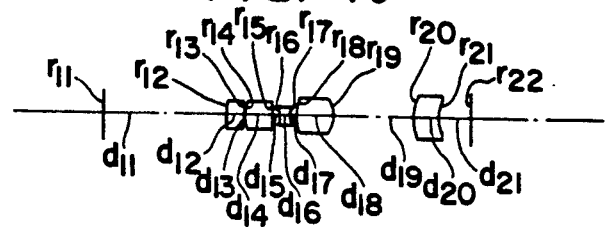

Example 2 of the optical system for the finder system according to the present invention has the composition illustrated in FIG. 9 and FIG. 10. FIG. 9 shows the composition of the finder optical system which is set for obtaining a visual field of the ordinary size, whereas FIG. 10 shows the composition of the section disposed between the first image surface and the second image surface in the finder optical system when it is set for providing a visual field of the panorama size.

In FIG. 9, the reference symbols $r_1$ through $r_{10}$ represent an objective lens system, the reference symbol $r_{11}$ designates the first image surface, the reference symbols $r_{12}$ through $r_{24}$ denote a relay lens system, the reference symbol $r_{23}$ through $r_{24}$ represent the second image surface, and the reference symbols $r_{23}$ and $r_{24}$ designate an eyepiece lens system.

The Example 2 is to be used in the Embodiment 3 and is adapted to change the magnification thereof by displacing a lens unit ($r_{12}$ through $r_{19}$) disposed in the relay lens system.

The aspherical surfaces which are adopted for the Examples 1 and 2 described above have shapes expressed by the following formula:

$$x = \frac{y^2/r}{1 + \sqrt{1 - p(y/r)^2}} + \sum_{i=2}^{n} A_{2i} y^{2i}$$

wherein the optical axis is taken as the x axis, the direction perpendicular to the optical axis is taken as the y axis, the reference symbol r represents the radius of curvature on the reference sphere of the aspherical surface of interest, the reference symbol p designates the conical constant and the reference symbol $A_{2i}$ denotes the aspherical surface coefficient.

As is understood from the foregoing description, the finder system according to the present invention is capable of changing a visual field of the ordinary size into another visual field of the panorama size by using a simple mechanism which performs change of the magnification of the finder optical system, exchange of the field stops and so on.

I claim:

1. A real image type finder system comprising in order from the object side,:
   an objective lens system having a positive power as a whole;
   a first field stop arranged on a first image surface formed by said objective lens system;
   a movable relay lens system which has a positive power as a whole to transmit both an image of an object formed on said first image surface and an image of said first stop to a second image surface;
   a second field stop disposed on said second image surface formed by said relay lens system; and
   an eyepiece lens system which has a positive power as a whole in order to observe said second image as well as an aperture formed by superimposing said relayed image of the first field stop and said second field stop;

wherein magnification of said finder system is varied by one of moving said relay lens system along an optical axis thereof and exchanging said relay lens system with a different relay lens system having a different magnification from that of said relay lens system; and wherein magnification of said second image is varied in accordance with said variation of magnification of said finder system and said aperture is formed by superimposing said relayed image of the first field stop and second field stop and said aperture is varied in shape in accordance with the variation in size of the relayed image of said first field stop.

2. A real image type finder system according to claim 1 wherein the magnification of the finder system is changed by replacing said relay lens system with another relay lens system having a magnification $\beta$ times as high as that of said relay lens system, said first field stop has an aperture of a rectangular shape having an aspect ratio of 2:3 and said second field stop for changing visual field has an aperture of a rectangular shape having an aspect ratio of $2/\beta:6/\beta$.

3. A real image type finder system according to claim 1 wherein said relay lens system consists of a plurality of lens units and the magnification of the finder system is changed by displacing at least one of said lens units.

4. A real image type finder system according to claim 3 wherein the magnification of the finder system can be enhanced $\beta$ times as high, said first field stop has a rectangular aperture shape having an aspect ratio of 2:3 and said second field stop for changing visual field has a rectangular aperture shape having an aspect raito of $2/\beta:6/\beta$.

5. A real image type finder system according to claim 1, wherein the aperture of said first field stop has an aspect ratio of 2:3 and the aperture of said second field stop has an aspect ratio of 2:6.

* * * * *